United States Patent

[11] 3,602,481

[72] Inventors Lee Martin
Elkhart, Ind.;
Clarence M. Fore, Nacogdoches, Tex.
[21] Appl. No. 848,198
[22] Filed Aug. 7, 1969
[45] Patented Aug. 31, 1971
[73] Assignee Nibco, Inc.
Elkhart, Ind.

[54] RESILIENT SEAT GATE VALVE
2 Claims, 8 Drawing Figs.
[52] U.S. Cl. ................................. 251/152,
251/203, 251/362
[51] Int. Cl. ...................................... F16k 51/00
[50] Field of Search........................... 251/152,
203, 328, 362

[56] References Cited
UNITED STATES PATENTS
| | | | |
|---|---|---|---|
| 1,020,449 | 3/1912 | Riggin .......................... | 251/152 |
| 3,207,471 | 9/1965 | Williams........................ | 251/328 |
| 3,356,334 | 12/1967 | Scaramucci.................... | 251/328 X |

Primary Examiner—Harold W. Weakley
Attorney—Price, Heneveld, Huizenga & Cooper

ABSTRACT: A rising stem gate valve having a removable resilient, polymeric valve seat, preferably polytetrafluoroethylene retained against a removable pipe bushing of the valve, and in one form having an axially protruding annular nose which provides a seat for the valve disc carried by the stem.

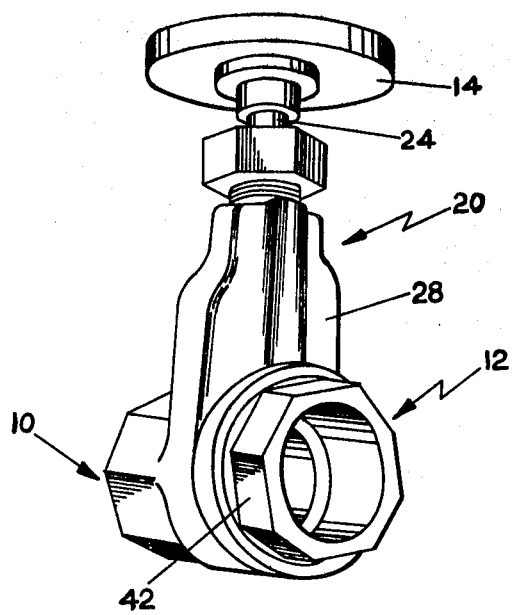
FIG. 1
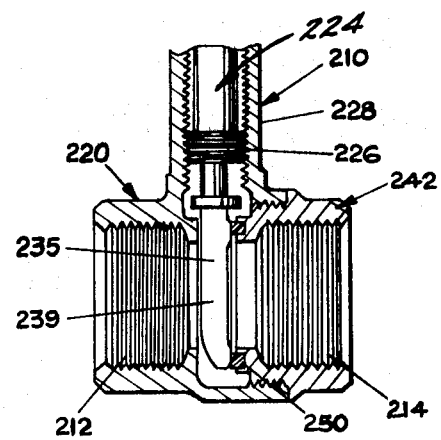
FIG. 7
FIG. 2
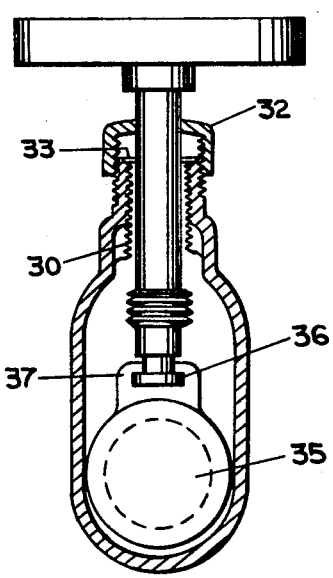
FIG. 3

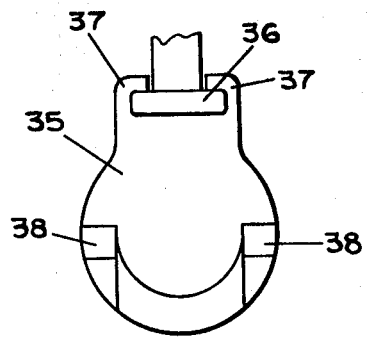
FIG. 4
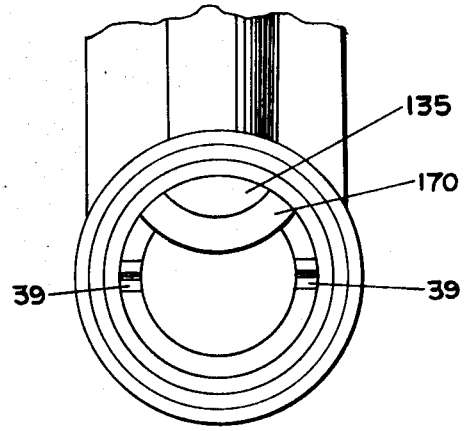
FIG. 5
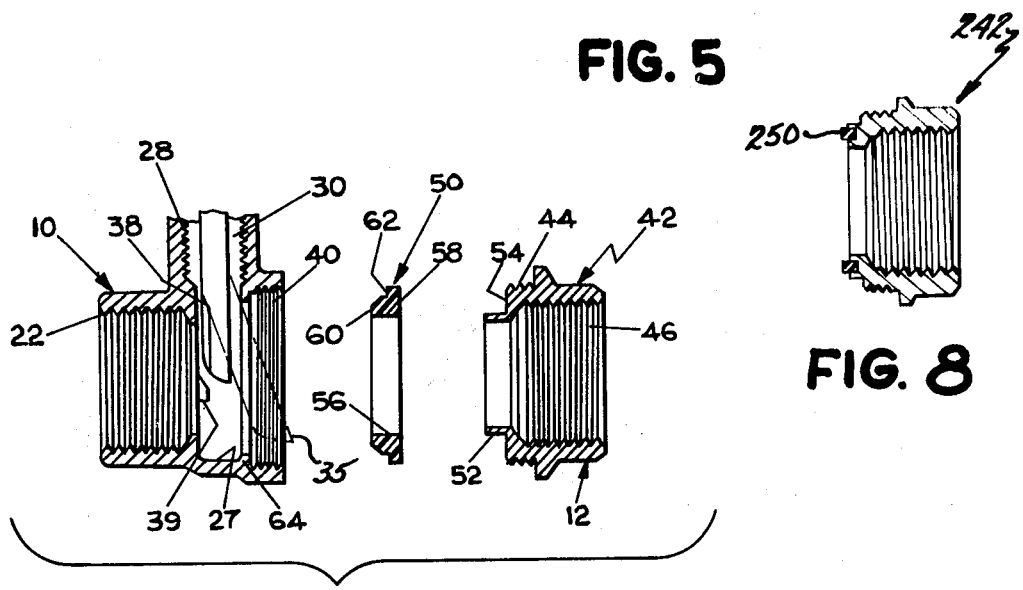
FIG. 6
FIG. 8

RESILIENT SEAT GATE VALVE

BACKGROUND OF THE INVENTION

This invention relates to a gate valve, and more particularly to a gate valve utilizing a resilient polymeric seat placed within the valve so as to be easily replaced when worn.

Gate valves in the past have been faced with difficulties in closing the gate against high pressure in the line and with the deformation of the valve seat such as occurs under wear and cold flow conditions. Attempts to solve these two problems have often resulted in constructions wherein the valve seat is somewhat complex and therefore expensive to initially manufacture and/or replace when worn. An example of such an attempted solution is a valve with a seat which can be removed only by withdrawing it out the bonnet. Such a valve seat is quite expensive and difficult to replace. Also, prior gate valves employing a resilient seal have a tendency to leak when the seal becomes worn or the resilient member becomes displaced.

SUMMARY OF THE INVENTION

The invention concerns a gate valve that effects a resilient seat without the disadvantages of the prior art. The gate valve has an externally threaded stem, a valve disc removably mounted on one end of the stem, a removable resilient valve seat, a body containing the stem, disc, and seat, the body having means for attaching the ends of two pipes and means for receiving the stem, the receiving means being an integral part of the body. The attaching means includes a removable pipe bushing, the bushing having means for attaching it to the body, the seat at the inner end of the bushing, and, in one form, confined between the bushing and the body, and means for wedging the disc against a surface of the valve seat when the disc is lowered into the closed position. In another form, the seat is confined in the bushing. The valve seat, in said one form, includes means on its disc-engaging surface for receiving a portion of the body, so that the seat is confined between the bushing and the body except for its disc-engaging nose. The body includes means for removing the seat and the disc out the end of the body which receives the bushing.

Accordingly, it is an object of this invention to provide a novel form of compact gate valve having a specially retained resilient valve seat to facilitate closure and to insure closure as the seat is worn. Sealing is assisted by the fluid pressure and the wedging action. As the resilient seat wears, the wedging action can be increased to maintain the seal. When the seat is fully worn a metal-to-metal seal occurs under the wedging action.

It is a further object of this invention to provide a gate valve of the above character wherein the valve seat resists deformation during use.

It is a related object of the invention to provide a gate valve of the above character wherein the valve seat is easily and inexpensively replaced when worn.

Other objects and advantages of the invention will become apparent upon reference to the following drawings and detailed discussion.

BRIEF DESCRIPTION OF THE DRAWINGS

FIG. 1 is a perspective view of the gate valve constructed according to the invention;

FIG. 2 is a front elevation taken partly in section along the axes of the pipe ports and the stem;

FIG. 3 is a fragmentary and elevational view taken partly in section through the axis of the stem and transverse to the axis of the pipe ports;

FIG. 4 is a fragmentary end elevational view of the valve disc utilized in the invention;

FIG. 5 is a fragmentary end elevational view similar to that of FIG. 3 except that no parts are in section, the disc is partly raised to the open position, and an alternate embodiment of the valve disc is illustrated;

FIG. 6 is a fragmentary exploded front elevational view similar to that illustrated in FIG. 2 except that the value disc is shown in its partly open position;

FIG. 7 is an elevational sectional view of a modified valve; and

FIG. 8 is a sectional elevational view of the bushing and seat for the valve in FIG. 7.

DESCRIPTION OF THE PREFERRED EMBODIMENTS

The gate valve is utilized between two pipes (not shown) which attach at opposite pipe ports 10 and 12 in conventional manner. The gate valve is shown as the using stem type, so that as a conventional handle 14 is turned, the stem rises up to raise the gate and allow flow between the two ports 10 and 12.

The gate valve has a body 20 having three openings. To provide the pipe ports 10 and 12, the body is provided with two openings 22 and 40 which are axially aligned and internally threaded. The threaded opening 22 accommodates the end of one of the pipes to which the valve is attached. The threaded opening 40 serves a function hereinafter described. To receive stem 24, which is externally threaded at 26 and move a valve disc into and out of a closure chamber 27, the body is provided with a neck 28 which extends transversely to the axis of openings 22 and 40, and is internally threaded at 30 to receive the threaded portion 26 of the stem. To receive a nut 32 which holds conventional packing 32a around the stem and above a washer 33, the hollow neck 28 is externally threaded at 34. To insure shell strength in the valve, and to better utilize materials, a bonnet has been omitted, the threaded portion 30 being integral with the rest of the body 20. This structure can be utilized because only the stem 24 goes into and out of the neck 28. The other parts of the valve such as valve seat 50 are inserted and removed, as hereinafter explained.

To block flow of liquid from opening 22 out through opening 40, a gate valve disc 35 is removably mounted on an end 36 of stem 24. To allow the disc to slip onto and off of the flange forming the enlarged end 36, a semicircular shoulder 37 is case integrally with disc 35 and contains a semicylindrical recess that receives flange 36. To insure that the disc bears against the valve seat when it is lowered into the closed position for the valve, the back of the disc is indented at opposite edges of the disc to provide diagonal camming surfaces 38. These are aligned with and bear upon two diagonal wedges 39 formed as part of body 20. Wedges 39 project into closure chamber 27 on opposite sides thereof so as to engage camming surfaces 38 when the disc is lowered.

The valve seat is specially confined within the body for engagement with disc 35 to prevent deformation of the seat as by cold flow of the seat material. To do this, opening 40 is threaded to receive a removable pipe bushing 42 therein by means of its external thread 44. To receive the other of the two pipes within the bushing, it is internally threaded at 46. To confine valve seat 50 between the body and bushing 42, the bushing is formed with an annular shoulder 52 at the end opposite to internal threads 46, and with an axial shoulder 54 adjacent shoulder 52.

The valve seat 50 is annularly shaped. Its internal bore 56 fits over shoulder 52. End surface 58 forms a right angle with bore 56 and abutting against shoulder 54 when the valve seat 50 is inserted over bushing 42. The valve seat can be slipped off bushing 42 when so desired, and yet bore 56 and end surface 58 are normally confined by bushing 42 during the operation of the valve. To complete the confinement of seal 50, surface 60 which engages the side of disc 35 opposite to camming surfaces 38 is stepped at 62 to engage a portion 64 of the body. Specifically, portion 64 is an axial shoulder adjacent to opening 40 and projecting out beyond the threads of opening 40, the shoulder 64 having a diameter which will accommodate the step 62. Shoulder 64 thus allows the remainder of surface 60 to contact disc 35 and yet serves to confine and grip the seal between body 20 and bushing 42. It should be noted that the length of annular shoulder 52 is less than the length of seat 50. Thus, seat 50 extends out beyond shoulder 52, allowing disc 35 to initially press against only nose surface 60 when the valve is closed and not against annular shoulder or retention rim 52. However, as seal 50 has its disc-engaging nose surface 60 gradually worn by use, and wedges 39 continue to press the disc towards opening 40 by means of camming surfaces 38, shoulder 52 will eventually contact disc 35, thereby providing a secondary metal-to-metal seal.

To effect the long wearing seal and insure that seat 50 allows the gate to open and close easily, the polymeric resilient seat is preferably formed entirely out of a lubricous plastic such as polytetrafluoroethylene, Nylon, polytrifluorochloroethylene, polypropylene, or other material having a low coefficient of expansion and friction. Because the seat 50 in this first form is readily separate and removable from bushing 42, only the seat has to be replaced when the seat is worn.

To allow seat 50 and disc 35 to be removed out of and placed into position through opening 40, the opening is formed larger than the outside diameter of seat 50, and larger than the width of disc 35. The length of disc 35 from its bottom edge to shoulders 37 is greater than the diameter of opening 40, but the disc can be laterally shifted in diagonal position through opening 40. This is accomplished by rotating the valve stem toward the closed position while tilting the lower edge of the disc, as with a finger, toward the opening (FIGS. 4 and 6). This allows shoulders 37 on the upper end of the disc to slide laterally off flange 36.

FIG. 5 illustrates an alternate embodiment wherein the seat engaging surface of the disc 35 has been changed. Thus, the disc 135 has a raised surface 170 comprising an annular shoulder which engages surface 60 of seat 50 to insure a more positive seating. The remaining parts of the valve indicated in FIG. 5 are identical with the parts previously discussed.

In FIGS. 7 and 8 are illustrated another form of valve which has some features in common with the valve in FIGS. 1-6, but is different in some respects. This valve 210 has a body 220 that includes an upstanding hollow neck 228, a first internally threaded flow passage 212, and a second flow passage 214 formed by bushing 242 that is threadably attachable to the body.

Mounted in an axial recess in the inner end of bushing 242 is annular resilient polymeric lubricous seat 250. It is retained to the bushing nose by crimping the thin outer bushing wall around it. Thus seat 250 is retained on one annular end, and on most of its inner and outer peripheries, but with the seat still extending beyond the bushing nose. Disc 235 is raised and lowered by stem 224 to the lower end of which the disc is attached. Stem 224 is raised and lowered by virtue of the thread inter engagement between its threaded collar 226 and the threaded inner periphery of neck 228. Disc 235 is wedged against seat 250 by offsets 239 during closure.

The operation of this valve is basically the same as that for the previously described valve. Normally, disc 235 engages only seat 250, but when the latter has worn, engages the nose end of bushing 250 to make a metal-to-metal seal.

Other forms of gate valves may be constructed utilizing the invention. For example, a nonrising stem valve can be made exactly as described above, except that the shoulder 28 will not in that case be threaded, and the stem 24 will be, the disc 35 riding up and down on the threads of the stem depending upon the direction the stem is rotated.

I claim:

1. A gate valve comprising: an externally threaded stem; a valve disc removable mounted on one end of said stem; a removable resilient valve seat; a body containing said stem, disc, and seat; means for attaching the ends of two pipes and means for receiving said stem, said receiving means being an integral part of said body; said attaching means including a removable pipe bushing, said bushing having means for attaching it to said body with said seat confined between said bushing and said body, said seat being annular, said bushing including a radially extending axial shoulder and an axially extending annular shoulder, said annular seat being removably placed over said annular shoulder into abutment with said axial shoulder, said seat extending axially beyond the axial end of said annular shoulder toward said disc to form a primary resilient sealing surface for said disc, said annular shoulder axial end being exposed toward said disc to form a secondary sealing surface for said disc with wear of said seat and wedging means in said body for wedging said disc against said primary sealing surface of said valve seat when said disc is lowered into the closed position and after said seat is worn, for wedging said disc against said secondary sealing surface.

2. A valve comprising: a body having an integral hollow upstanding neck, and a pair of connecting flow passages, one of which is formed by a bushing threadably attached into and removable from said body, said body having an enlarged opening receiving said bushing; a stem threadably engaged to and generally received by said neck; closure disc attached to the lower end of said stem but laterally removable therefrom; said passage formed by said bushing being too small to pass said disc therethrough but said enlarged body opening being capable of passing said disc for assembly to and disassembly from said stem; said bushing retaining a resilient, lubricous polymeric annular seat at its inner end; wedging means cooperative with said disc to force said disc into sealing engagement with said seat.

PO-1050
(5/69)

UNITED STATES PATENT OFFICE
CERTIFICATE OF CORRECTION

Patent No. 3,602,481  Dated August 31, 1971

Inventor(s) Lee Martin and Clarence M. Fore

It is certified that error appears in the above-identified patent and that said Letters Patent are hereby corrected as shown below:

Column 2, line 13

"using" should be ---rising---.

Signed and sealed this 14th day of March 1972.

(SEAL)
Attest:

EDWARD M. FLETCHER, JR.
Attesting Officer

ROBERT GOTTSCHALK
Commissioner of Patents